US007224288B2

(12) United States Patent
Hall et al.

(10) Patent No.: US 7,224,288 B2
(45) Date of Patent: May 29, 2007

(54) LINK MODULE FOR A DOWNHOLE DRILLING NETWORK

(75) Inventors: David R. Hall, Provo, UT (US); Joe Fox, Provo, UT (US)

(73) Assignee: IntelliServ, Inc., Provo, UT (US)

( * ) Notice: Subject to any disclaimer, the term of this patent is extended or adjusted under 35 U.S.C. 154(b) by 563 days.

(21) Appl. No.: 10/613,549

(22) Filed: Jul. 2, 2003

(65) Prior Publication Data

US 2005/0001735 A1    Jan. 6, 2005

(51) Int. Cl.
*G01V 3/00* (2006.01)
(52) U.S. Cl. .............................. 340/853.7; 340/853.1; 340/854.4; 166/66; 166/385; 73/40; 73/152; 175/50; 324/342; 324/356
(58) Field of Classification Search ............. 340/853.7, 340/854.4, 853.1, 870.1, 853, 854, 855; 324/342, 324/356; 166/66, 385; 175/50; 73/40, 152; 439/577
See application file for complete search history.

(56) References Cited

U.S. PATENT DOCUMENTS

| 749,633 | A | 1/1904 | Seeley |
|---|---|---|---|
| 2,178,931 | A | 11/1939 | Crites et al. |
| 2,197,392 | A | 4/1940 | Hawthorn |
| 2,249,769 | A | 7/1941 | Leonardon |
| 2,301,783 | A | 11/1942 | Lee |
| 2,354,887 | A | 8/1944 | Silverman et al. |
| 2,379,800 | A | 7/1945 | Hare |
| 2,414,719 | A | 1/1947 | Cloud |
| 2,531,120 | A | 11/1950 | Feaster |
| 2,633,414 | A | 3/1953 | Boivinet |
| 2,659,773 | A | 11/1953 | Barney |
| 2,662,123 | A | 12/1953 | Koenig, Jr. |
| 2,748,358 | A | 5/1956 | Johnston |
| 2,974,303 | A | 3/1961 | Dixon |
| 2,982,360 | A | 5/1961 | Morton et al. |
| 3,079,549 | A | 2/1963 | Martin |
| 3,090,031 | A | 5/1963 | Lord |
| 3,170,137 | A | 2/1965 | Brandt |
| 3,186,222 | A | * | 6/1965 | Martin ..................... 340/853.7 |
| 3,194,886 | A | 7/1965 | Mason |

(Continued)

FOREIGN PATENT DOCUMENTS

EP        0399987 A1    11/1990

(Continued)

*Primary Examiner*—Jeffery Hofsass
*Assistant Examiner*—Sisay Yacob
(74) *Attorney, Agent, or Firm*—Tyson J. Wilde; Jeffrey E. Daly (57) ABSTRACT

A repeater is disclosed in one embodiment of the present invention as including a cylindrical housing, characterized by a proximal end and a distal end, and having a substantially cylindrical wall, the cylindrical wall defining a central bore passing therethrough. The cylindrical housing is formed to define at least one recess in the cylindrical wall, into which a repeater is inserted. The cylindrical housing also includes an annular recess formed into at least one of the proximal end and the distal end. An annular transmission element, operably connected to the repeater, is located in the annular recess. In selected embodiments, the annular transmission element inductively converts electrical energy to magnetic energy. In other embodiments, the annular transmission element includes an electrical contact to transmit electrical energy directly to another contact.

20 Claims, 8 Drawing Sheets

U.S. PATENT DOCUMENTS

| | | |
|---|---|---|
| 3,209,323 A | 9/1965 | Grossman, Jr. |
| 3,227,973 A | 1/1966 | Gray |
| 3,253,245 A | 5/1966 | Brandt |
| 3,518,608 A | 6/1970 | Papadopoulos |
| 3,696,332 A | 10/1972 | Dickson, Jr. et al. |
| 3,793,632 A | 2/1974 | Still |
| 3,807,502 A | 4/1974 | Heilhecker et al. |
| 3,879,097 A | 4/1975 | Oertle |
| 3,930,220 A | 12/1975 | Shawhan |
| 3,957,118 A | 5/1976 | Barry et al. |
| 3,989,330 A | 11/1976 | Cullen et al. |
| 4,012,092 A | 3/1977 | Godbey |
| 4,087,781 A | 5/1978 | Grossi et al. |
| 4,095,865 A | 6/1978 | Denison et al. |
| 4,121,193 A | 10/1978 | Denison |
| 4,126,848 A | 11/1978 | Denison |
| 4,215,426 A | 7/1980 | Klatt |
| 4,220,381 A | 9/1980 | Van der Graaf |
| 4,348,672 A | 9/1982 | Givler |
| 4,445,734 A | 5/1984 | Cunningham |
| 4,496,203 A | 1/1985 | Meadows |
| 4,537,457 A | 8/1985 | Davis, Jr. et al. |
| 4,578,675 A | 3/1986 | MacLeod |
| 4,605,268 A * | 8/1986 | Meador ............... 439/194 |
| 4,660,910 A | 4/1987 | Sharp et al. |
| 4,683,944 A | 8/1987 | Curlett |
| 4,698,631 A | 10/1987 | Kelly, Jr. et al. |
| 4,722,402 A | 2/1988 | Weldon |
| 4,785,247 A | 11/1988 | Meador et al. |
| 4,788,544 A | 11/1988 | Howard |
| 4,806,928 A | 2/1989 | Veneruso |
| 4,884,071 A | 11/1989 | Howard |
| 4,901,069 A | 2/1990 | Veneruso |
| 4,914,433 A | 4/1990 | Galle |
| 4,924,949 A | 5/1990 | Curlett |
| 5,008,664 A | 4/1991 | More et al. |
| 5,052,941 A | 10/1991 | Hernandez-Marti et al. |
| 5,148,408 A | 9/1992 | Matthews |
| 5,166,908 A * | 11/1992 | Montgomery ............ 367/165 |
| 5,248,857 A | 9/1993 | Ollivier |
| 5,278,550 A | 1/1994 | Rhein-Knudsen et al. |
| 5,302,138 A | 4/1994 | Shields |
| 5,311,661 A | 5/1994 | Zifferer |
| 5,332,049 A | 7/1994 | Tew |
| 5,334,801 A | 8/1994 | Mohn |
| 5,371,496 A | 12/1994 | Tanamachi |
| 5,454,605 A | 10/1995 | Mott |
| 5,455,573 A | 10/1995 | Delatorre |
| 5,505,502 A | 4/1996 | Smith et al. |
| 5,517,843 A | 5/1996 | Winship |
| 5,521,592 A | 5/1996 | Veneruso |
| 5,568,448 A | 10/1996 | Tanigushi et al. |
| 5,650,983 A | 7/1997 | Kondo et al. |
| 5,691,712 A | 11/1997 | Meek et al. |
| 5,743,301 A | 4/1998 | Winship |
| RE35,790 E | 5/1998 | Pustanyk et al. |
| 5,810,401 A | 9/1998 | Mosing et al. |
| 5,833,490 A | 11/1998 | Bouldin |
| 5,853,199 A | 12/1998 | Wilson |
| 5,856,710 A | 1/1999 | Baughman et al. |
| 5,898,408 A | 4/1999 | Du |
| 5,908,212 A | 6/1999 | Smith et al. |
| 5,924,499 A | 7/1999 | Birchak et al. |
| 5,942,990 A | 8/1999 | Smith et al. |
| 5,955,966 A | 9/1999 | Jeffryes et al. |
| 5,959,547 A | 9/1999 | Tubel et al. |
| 5,971,072 A | 10/1999 | Huber et al. |
| 6,030,004 A | 2/2000 | Schock et al. |
| 6,041,872 A | 3/2000 | Holcomb |
| 6,045,165 A | 4/2000 | Sugino et al. |
| 6,046,685 A | 4/2000 | Tubel |
| 6,057,784 A | 5/2000 | Schaaf et al. |
| 6,075,461 A | 6/2000 | Smith |
| 6,104,707 A | 8/2000 | Abraham |
| 6,108,268 A | 8/2000 | Moss |
| 6,123,561 A | 9/2000 | Turner et al. |
| 6,141,763 A | 10/2000 | Smith et al. |
| 6,144,316 A | 11/2000 | Skinner |
| 6,160,492 A | 12/2000 | Herman |
| 6,173,334 B1 | 1/2001 | Matsuzaki et al. |
| 6,177,882 B1 | 1/2001 | Ringgenberg et al. |
| 6,188,223 B1 | 2/2001 | van Steenwyk et al. |
| 6,196,335 B1 | 3/2001 | Rodney |
| 6,209,632 B1 | 4/2001 | Holbert et al. |
| 6,218,959 B1 | 4/2001 | Smith |
| 6,223,826 B1 | 5/2001 | Chau et al. |
| 6,364,017 B1 * | 4/2002 | Stout et al. ............ 166/278 |
| 6,367,565 B1 | 4/2002 | Hall |
| 6,392,317 B1 | 5/2002 | Hall et al. |
| 6,405,795 B2 | 6/2002 | Holbert et al. |
| 6,641,434 B2 | 11/2003 | Boyle et al. |
| 6,655,464 B2 | 12/2003 | Chau et al. |
| 6,666,274 B2 * | 12/2003 | Hughes ............... 166/385 |
| 6,670,880 B1 | 12/2003 | Hall et al. |
| 6,688,396 B2 * | 2/2004 | Floerke et al. ......... 166/380 |
| 6,752,207 B2 * | 6/2004 | Danos et al. .......... 166/278 |
| 6,866,306 B2 * | 3/2005 | Boyle et al. .......... 285/333 |
| 6,950,034 B2 * | 9/2005 | Pacault et al. ........ 340/855.2 |
| 2002/0061224 A1 * | 5/2002 | Allamon et al. ....... 403/374.1 |
| 2002/0135179 A1 | 9/2002 | Boyle et al. |
| 2002/0193004 A1 | 12/2002 | Boyle et al. |
| 2003/0070842 A1 | 4/2003 | Bailey et al. |
| 2003/0102980 A1 * | 6/2003 | Koro ................. 340/853.7 |
| 2003/0213598 A1 | 11/2003 | Hughes |
| 2004/0217880 A1 * | 11/2004 | Clark et al. .......... 340/854.9 |

FOREIGN PATENT DOCUMENTS

| | | |
|---|---|---|
| WO | WO 8801096 | 2/1988 |
| WO | WO9014497 | 11/1990 |

* cited by examiner

LINK MODULE FOR A DOWNHOLE DRILLING NETWORK

This invention was made with government support under Contract No. DE-FC26-97FT343656 awarded by the U.S. Department of Energy. The government has certain rights in the invention.

BACKGROUND OF THE INVENTION

1. The Field of the Invention

This invention relates to oil and gas drilling, and more particularly to apparatus and methods for reliably transmitting information between downhole drilling components.

2. The Relevant Art

The need for signal repeaters to counteract signal loss encountered when transmitting data from downhole components to the earth's surface is known or has been suggested. Nevertheless, in downhole telemetry systems transmitting data on wires or cables integrated directly into the drill string, few if any useable implementations are known for repeating and amplifying data signals. The following references teach repeaters that are used in wireless electromagnetic or acoustic wave transmission systems, and are not applicable to wired solutions. Furthermore, none of the references address all of the challenges, such as cable routing from the repeater up and down the drill string, that are inherent in wired solutions.

U.S. Pat. No. 6,218,959 issued Apr. 17, 2001 to Smith describes a system and method of fail-safe communication of information transmitted in the form of electromagnetic wave fronts that propagate through the earth between surface equipment and downhole components. The system comprises two or more repeaters disposed within a well bore such that the two repeaters receive each signal carrying the telemetered information. The repeater that is farther from the source includes a memory device that stores information carried in the signal. A timer device, in the repeater that is farther from the source, triggers the retransmission of the information after a predetermined time period, unless the repeater that is farther from the source has detected a signal carrying the information, generated by the repeater, that is closer to the source.

U.S. Pat. No. 6,177,882 issued Jan. 23, 2001 to Ringgenberg et. al teaches downhole repeaters that utilize electromagnetic and acoustic waves to retransmit signals carrying information and methods for use of the same. The repeaters and methods provide for real-time communication between downhole equipment and the surface, and for the telemetering of information and commands from the surface to downhole tools disposed in a well using both electromagnetic and acoustic waves to carry information. The repeaters and methods detect and amplify signals carrying information at various depths in the well bore, thereby alleviating signal attenuation.

U.S. Pat. No. 6,160,492 issued Dec. 12, 2000 to Herman teaches an electromagnetic telemetry system for changing the operational state of a downhole device. The system comprises an electromagnetic transmitter disposed in a first well bore that transmits a command signal. An electromagnetic repeater disposed in a second well bore receives the command signal and retransmits the command signal to an electromagnetic receiver disposed in a third well bore that is remote from the first well bore. The electromagnetic receiver is operably connected to the downhole device such that the command signal received from the electromagnetic repeater is used to prompt the downhole device to change operational states.

U.S. Pat. No. 6,144,316 issued Nov. 7, 2000 to Skinner teaches an electromagnetic and acoustic signal repeater for communicating information between surface equipment and downhole equipment. The repeater comprises an electromagnetic receiver and an acoustic receiver for respectively receiving and transforming electromagnetic input signals and acoustic input signals into electrical signals that are processed and amplified by an electronics package. The electronics package generates an electrical output signal that is forwarded to an electromagnetic transmitter and an acoustic transmitter for generating an electromagnetic output signal that is radiated into the earth and an acoustic output signal that is acoustically transmitted.

U.S. Pat. No. 6,075,461 issued Jun. 13, 2000 to Smith teaches an apparatus, method and system for communicating information between downhole equipment and surface equipment. An electromagnetic signal repeater apparatus comprises a housing that is securably mountable to the exterior of a pipe string disposed in a well bore. The housing includes first and second housing subassemblies. The first housing subassembly is electrically isolated from the second housing subassembly by a gap subassembly having a length that is at least two times the diameter of the housing. The first housing subassembly is electrically isolated from the pipe string and is secured thereto with a nonconductive strap. The second housing subassembly is electrically coupled with the pipe string and is secured thereto with a conductive strap. An electronics package and a battery are disposed within the housing. The electronics package receives, processes, and retransmits the information being communicated between the downhole equipment and the surface equipment via electromagnetic waves.

In view of the foregoing, what are needed are apparatus and methods providing signal amplification in high-speed downhole telemetry systems that transmit data using cables or wires directly integrated into the drill string.

What are further needed are apparatus and methods to seal electronics of the repeater from the surrounding environment, while providing routing of cables to and from the repeater traveling uphole and downhole.

It would be a further advance to provide apparatus and methods that not only repeat or amplify a signal, but could also gather data from various sensors such as inclinometers, pressure transducers, thermocouplers, accelerometers, imaging devices, seismic devices, and the like, as well as provide control signals to various of these device to control them remotely.

SUMMARY OF THE INVENTION

In view of the foregoing, it is a primary object of the present invention to provide a robust repeater for amplifying signals in high-speed downhole telemetry systems that transmit data using cables or wires directly integrated into the drill string. It is a further object to provide adequate isolation of electronics of the repeater from the surrounding environment, while providing means of routing cables to and from the repeater traveling uphole and downhole. It is a further object to not only boost or amplify a signal, but to also gather data from various sensors such as inclinometers, pressure transducers, thermocouplers, accelerometers, imaging devices, seismic devices, and the like, as well as provide control signals to various of these device to control them remotely.

Consistent with the foregoing objects, and in accordance with the invention as embodied and broadly described herein, a repeater is disclosed in one embodiment of the present invention as including a cylindrical housing, characterized by a proximal end and a distal end, and having a substantially cylindrical wall, the cylindrical wall defining a central bore passing therethrough. The cylindrical housing is formed to define at least one recess in the cylindrical wall, into which a repeater is inserted. The cylindrical housing also includes an annular recess formed into at least one of the proximal end and the distal end. An annular transmission element, operably connected to the repeater, is located in the annular recess.

One or several channels may be formed within the cylindrical housing that extend from the recess to the proximal end, the distal end, or both. In selected embodiments, the annular transmission element inductively converts electrical energy to magnetic energy. In other embodiments, the annular transmission element includes an electrical contact to transmit electrical energy directly to another contact. In certain embodiments, at least one battery is located in another recess provided in the cylindrical housing.

In selected embodiments, the cylindrical housing is inserted into the bore of a host downhole tool. The host downhole tool may include a pin end and a box end, the pin end having an external threaded portion and the box end having an internal threaded portion. In certain embodiments, the box end lacks an integrated secondary shoulder. In this case, a secondary shoulder insert, independent from the box end, may be inserted into the box end, and may be capable of absorbing stresses normally incident on an integrated secondary shoulder.

In selected embodiments, stresses normally incident on a secondary shoulder are not imposed on the cylindrical housing. Surface characteristics of the secondary shoulder insert may engage corresponding surface characteristics of the inside diameter of the host tool to transfer a load, incident on the secondary shoulder insert, to the host tool.

In selected embodiments, the repeater circuit further comprises a data acquisition circuit to acquire data from at least one sensor. The sensor may be a pressure transducer, an inclinometer, a thermocoupler, an accelerometer, an imaging device, a seismic device, or the like. The repeater circuit may also include added functionality including signal filtering circuitry, signal error checking circuitry, device control circuitry, a modem, a digital signal processor, a microcontroller, and the like.

In another aspect of the invention, a downhole link module includes a cylindrical housing, characterized by a proximal end and a distal end, having a substantially cylindrical wall, the cylindrical wall defining a central bore passing therethrough. The cylindrical housing is formed to define at least one recess in the cylindrical wall to accommodate a repeater circuit. A data acquisition circuit, located within the recess, is connected to the repeater circuit to acquire data from at least one sensor.

In yet another aspect of the invention, a downhole repeater may include a cylindrical housing, characterized by a proximal end and a distal end, having a substantially cylindrical wall, the cylindrical wall defining a central bore passing therethrough. The cylindrical housing has at least one recess formed into the outer rounded surface of the cylindrical wall, accommodating a signal repeater.

BRIEF DESCRIPTION OF THE DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of embodiments of apparatus and methods of the present invention, as represented in the Figures, is not intended to limit the scope of the invention, as claimed, but is merely representative of various selected embodiments of the invention.

The illustrated embodiments of the invention will be best understood by reference to the drawings, wherein like parts are designated by like numerals throughout. Those of ordinary skill in the art will, of course, appreciate that various modifications to the apparatus and methods described herein may easily be made without departing from the essential characteristics of the invention, as described in connection with the Figures. Thus, the following description of the Figures is intended only by way of example, and simply illustrates certain selected embodiments consistent with the invention as claimed herein.

Figure 1:
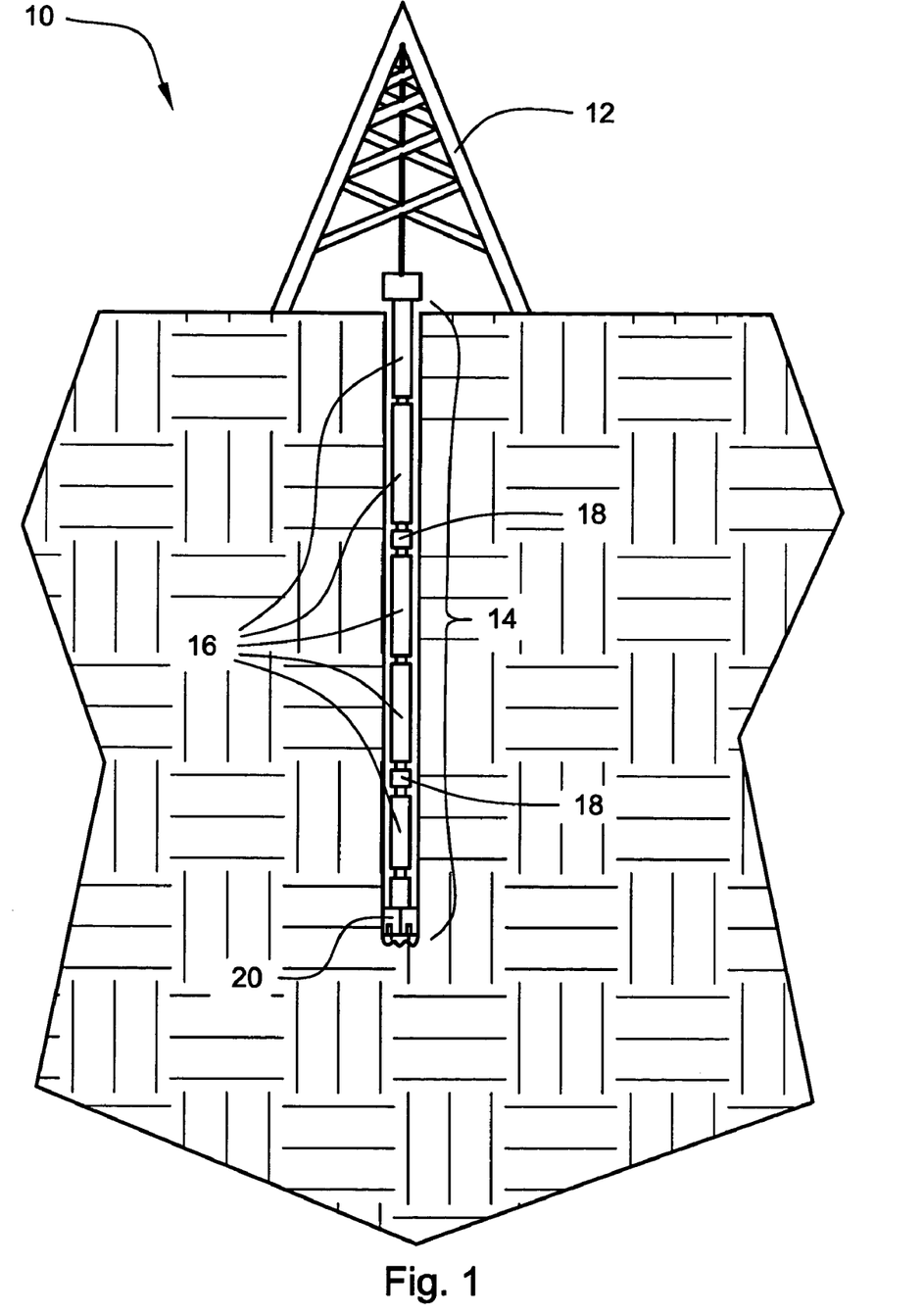
FIG. 1 is a profile view of a drill rig illustrating a context in which an apparatus and method in accordance with the invention may be used.

Referring to FIG. 1, a drill rig 10 may include a derrick 12 used to operate a drill string 14. The drill string 14 may be comprised of multiple sections of drill pipe 16 and other downhole tools 16. A drill bit 20 may be connected to the end of the drill string 14. In certain instances, a drill string 14 may extend into the ground 20,000 feet or more. Thus, when information is transmitted up or down the drill string 14, ample opportunity exists for signal loss.

Signal loss may occur as a data signal is transmitted from one downhole tool to another. In certain instances, an electrical signal may be converted to a magnetic field or vice versa when encountering tool joints, losing energy each time it is converted. Signal loss may occur because of signal attenuation in cables or wires due to the sheer length of the drill string. Thus, apparatus and methods are needed to ensure that data received from a drill bit 20 or other downhole tool 16 is safely transmitted to the surface. In selected embodiments, one or several repeaters 18 or signal boosters 18 may be inserted at desired intervals along the drill string 14, such as every 1000 to 5000 feet. In selected embodiments, a repeater 18 may be integrated into an existing drill pipe 16 or downhole tool 16, or the repeater 18 may be a downhole tool 18 dedicated exclusively to that function.

Figure 2:
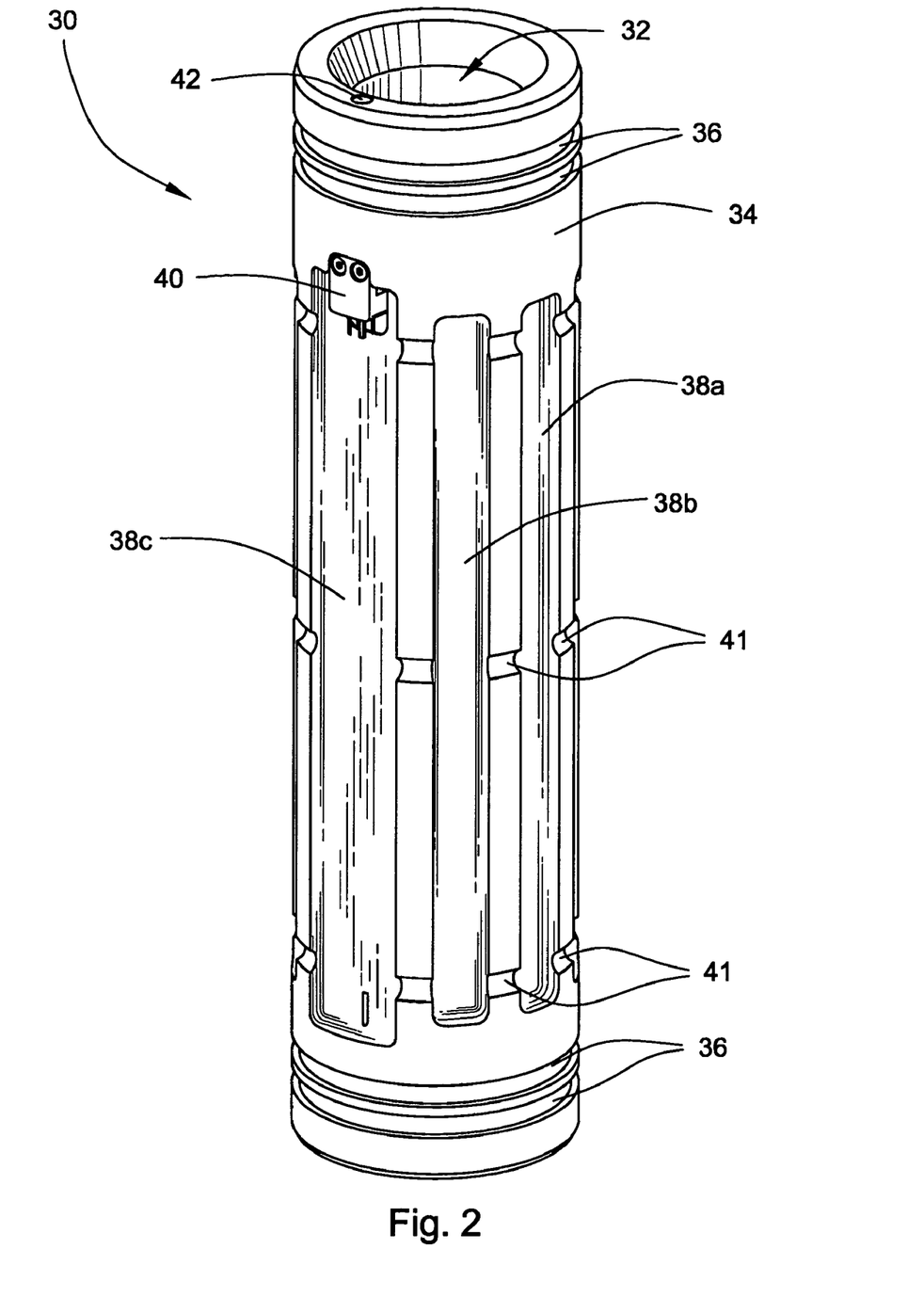
FIG. 2 is a perspective view illustrating one embodiment of a link module configured for insertion into a host downhole tool.

Referring to FIG. 2, a link module 30, or a repeater 30, may include a cylindrical housing 34 defining a central bore 32. The cylindrical housing 34 may be substantially circular, or in other embodiments, may be polygonal. The central bore 32 may have a diameter that is slightly smaller than the inner bore diameter of a typical section of drill pipe 16 to accommodate and provide space to components of the link module 30, or repeater 30.

Nevertheless, in selected embodiments, as batteries and electronic components become more compact, it is feasible that the central bore 32 of the link module 30 could be substantially equal to that normally encountered in sections of drill pipe 16 or other downhole tools 16. The link module 30 may be configured for insertion into a host downhole tool. Thus, the link module 30 may be removed or inserted as needed to access or service components located therein.

In selected embodiments, the link module 30 may include one or several grooves 36 or seal contact surfaces 36 to seal the link module 30 within a host downhole tool. The host downhole tool will be described in more detail in the description of FIG. 6. Seals inserted into the seal contact surfaces 36 or grooves 36 may prevent fluids such as drilling mud, lubricants, oil, water, and the like from contaminating circuitry or components inside the link module 30. Moreover, the entry of other substances such as dirt, rocks, gasses, and the like, may also be prevented.

In selected embodiments, the link module 30 may include one or several recesses 38a-c to house various components contained by the link module 30, or repeater 30. Selected recesses 38 may contain circuitry while others 38 may be used for batteries or other components. One or several channels 41 may be milled or formed into the cylindrical housing 34 to provide for the routing of wires between recesses 38. In selected embodiments, a connector 40 may be used to connect link module circuitry to a cable, wire, or other link, traveling up or down the drill string 14. An aperture 42 may likewise be provided for routing cable, wire, or other transmission means up or down the drill string 14.

Figure 3:
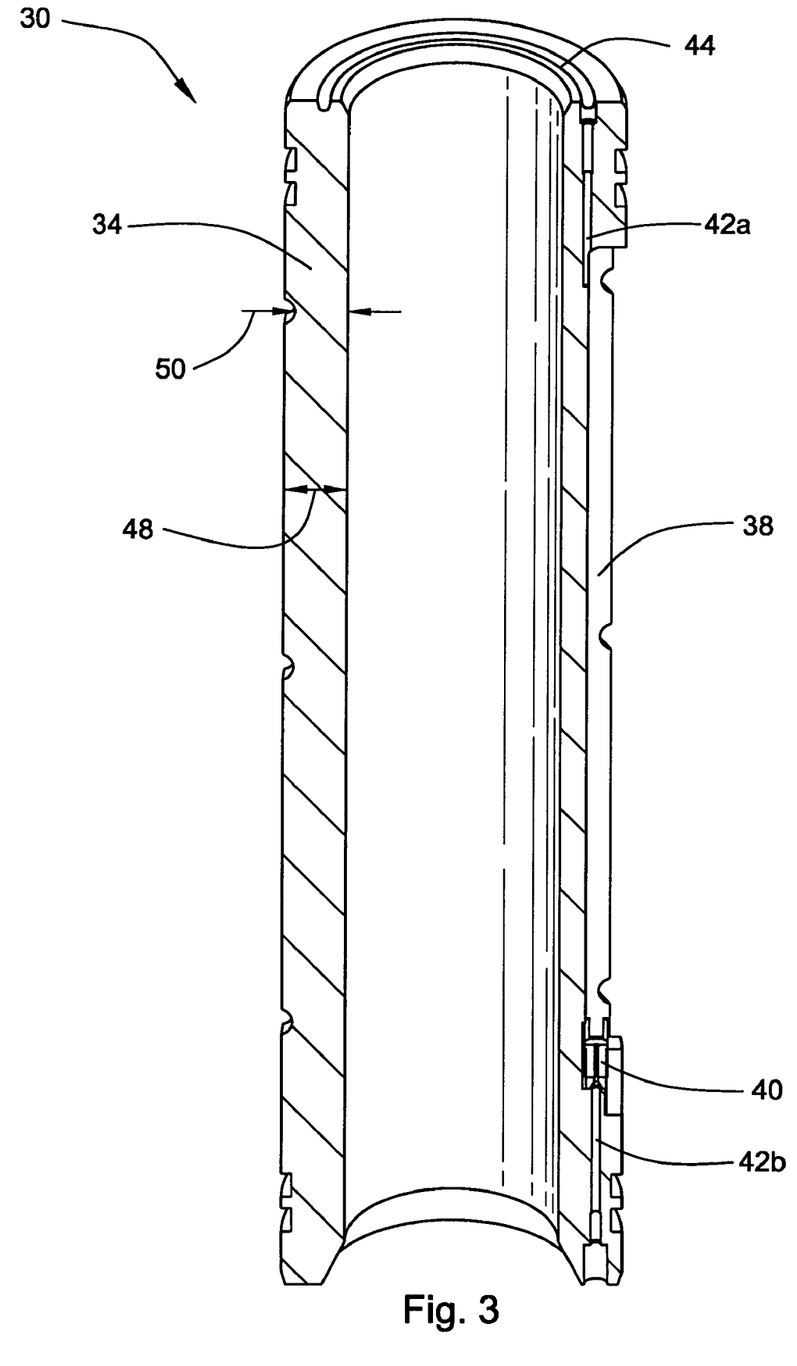
FIG. 3 is a perspective cross-sectional view illustrating one embodiment of the internal makeup of a link module in accordance with the present invention.

Referring to FIG. 3, an inverted cross-sectional view of the drawing of FIG. 2 is illustrated. As illustrated, the link module 30 may be characterized by a general wall thickness 48. Likewise, in regions proximate recesses 38 or other channels 41, a thinner wall thickness 50 may be present. Nevertheless, a critical wall thickness 48 should be maintained to provide structural reliability to the link module 30 to support stresses encountered in a downhole environment.

The cylindrical housing 34 may be constructed of any suitable material including steel, aluminum, plastics, and the like, capable of withstanding the pressures, stresses, temperatures, and abrasive nature of a downhole environment.

As illustrated, one or several transmission paths 42a, 42b may be milled or formed into the wall of the link module 30 to provide an outlet for cables, wires, or other transmission media exiting the recess 38. In selected embodiments, connector 40 may be provided to simply link up with or connect to repeater circuitry, or in other embodiments, a channel 42a may enable the routing of cables, wires, and the like from a repeater circuit, within the recess 38, to a transmission element (not shown). For example, a transmission element may be provided in an annular recess 44 milled or otherwise formed into the end of the cylindrical housing 34.

Figure 4:
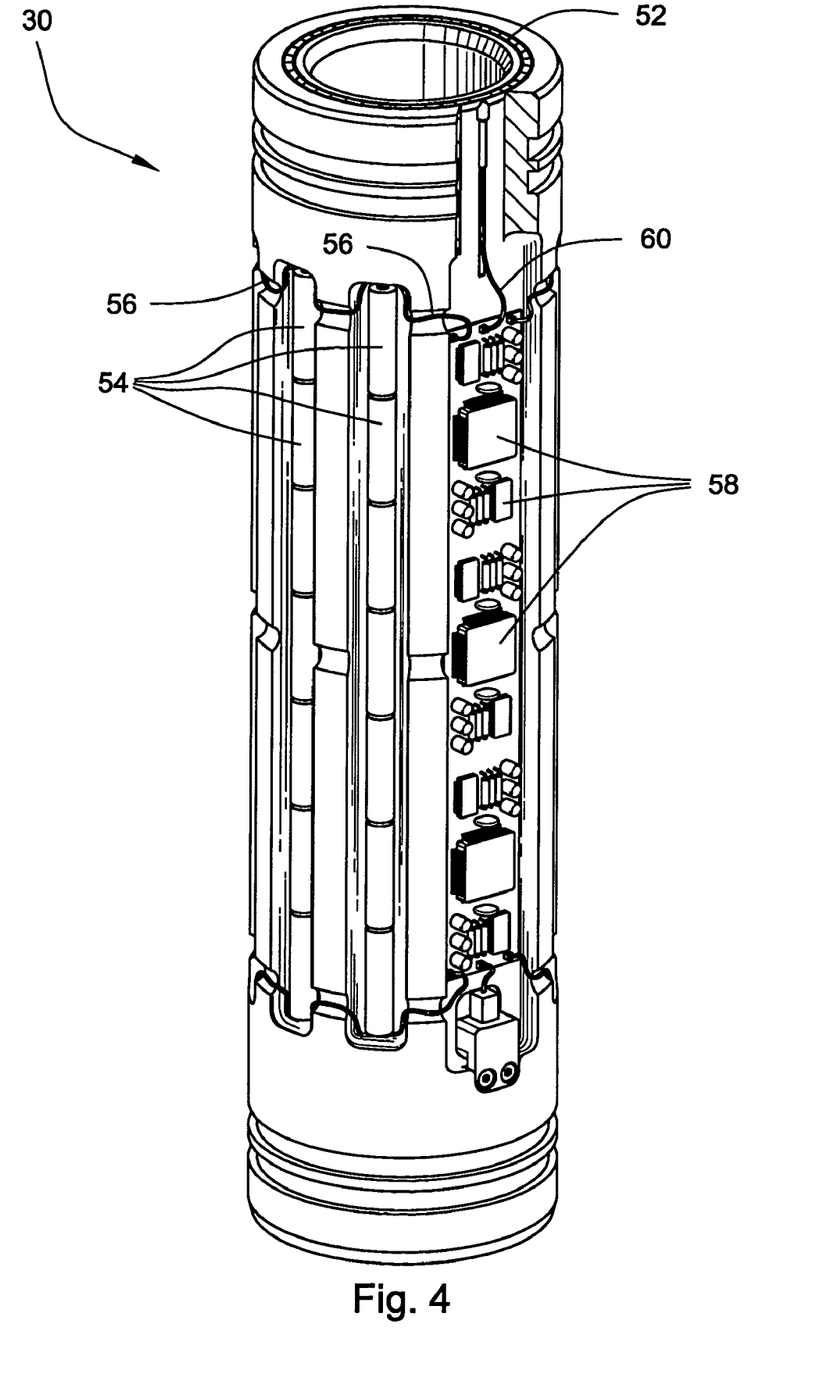
FIG. 4 is an inverted perspective view illustrating one embodiment of various electronic components that may be included within a link module in accordance with the present invention.

Referring to FIG. 4, a link module 30, or repeater 30, is illustrated equipped with components or circuitry needed to provide functionality to the link module 30. For example, batteries 54 connected in series or parallel may be inserted into selected recesses 38 of the link module 30. Wires 56 may be routed through channels 41 interconnecting the recesses 38 to connect the batteries 54 together, or to connect the batteries to the link module circuit 58.

Likewise, the link module circuit 58, or components 58, may be located within other recesses 38. As was previously stated, a conductor 60, cable 60, or other transmission media 60, may travel from the link module circuit 58 to a transmission element 52. The transmission element 52 may transmit energy to another transmission element 52 in contact therewith. The transmission element 52 may have an annular shape and may transmit energy by direct electrical contact, or may convert an electrical current to a magnetic field. The magnetic field may then be detected by another transmission element 52 in close proximity thereto located on a subsequent downhole tool 16.

Figure 5:
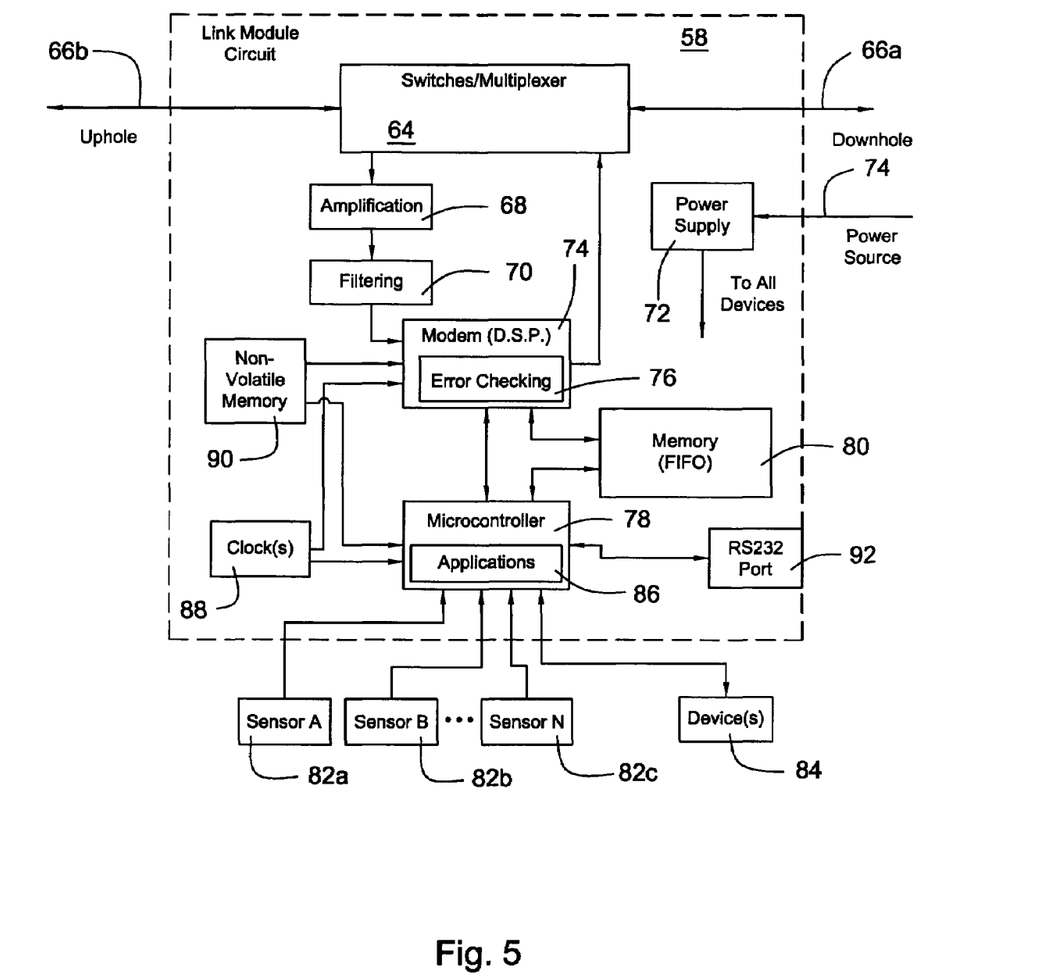
FIG. 5 is a schematic block diagram illustrating one embodiment of various components that may be included within a link module circuit in accordance with the invention.

Referring to FIG. 5, in selected embodiments, a link module circuit 58 within the link module 30 may include various components to provide desired functionality. For example switches 64, multiplexers 64, or a combination thereof may be used to receive, switch, and multiplex signals, received from uphole 66b and downhole 66a sources, into and out of the link module circuit 58. The switches/multiplexers 64 may direct traffic such as data packets or other signals into and out of the link module circuit 58, and may ensure that the packets or signals are transmitted at proper time intervals, frequencies, or a combination thereof.

In certain embodiments, the multiplexer 64 may transmit several signals simultaneously on different carrier frequencies. In other embodiments, the multiplexer 64 may coordinate the time-division multiplexing of several signals. Signals or packets or received by the switch/multiplexer 64 may be amplified 68 and filtered 70, such as to remove noise. In certain embodiments received signals may simply be amplified. In other embodiments, the signals may be received, data may be demodulated therefrom and stored, and the data may be remodulated and retransmitted on a selected carrier frequency having greater signal strength. A modem 74 may be used to demodulate analog signals received from the switch/multiplexer into digital data 64 and modulate digital data into analog signals for transfer to the switches/multiplexer where they may be transmitted uphole or downhole The modem 74 may also perform various tasks such as error-checking 76. This is typically performed when the data is digital. The modem 74 may also communicate with a microcontroller 78. The microcontroller 78 may execute any of numerous applications 86. For example, the microcontroller 78 may run applications 86 whose primary function is acquire data from one or a plurality of sensors 82*a-c*. For example, the microcontroller 78 may interface to sensors 82 such as inclinometers, thermocouplers, accelerometers, imaging devices, seismic data gathering devices, or other sensors. Thus, the link module circuit 58 may include circuitry functioning as a data acquisition tool.

In other embodiments, the microcontroller 78 may run applications 86 that may control various devices 84 located downhole. That is, not only may the link module circuit 58 be used as a repeater, and as a data gathering device, but may also be used to provide control signals to selected devices as needed. The link module circuit 58 may include a memory device 80 such as a FIFO 80 that may be used to store data needed by or transferred between the modem 74 and the microcontroller 78.

Other components of the link module circuit 58 may include non-volatile memory 90, which may be used to store data, such as configuration settings, node addresses, system settings, and the like. One or several clocks 88 may be provided to provide clock signals to the modem 74, the microcontroller 78, or any other device. A power supply 72 may receive power from an external power source such as the batteries 54 illustrated in FIG. 4. The power supply 72 may provide power to any or all of the components located within the link module circuit 58. Likewise, an RS232 port 92 maybe used to provide a serial connection to the link module circuit.

Thus, the link module circuit 58 described in FIG. 5 may have many more functions than those supplied by a simple signal repeater. The link module circuit 58 may be though of as a node 30 connected to a downhole network, and may provide many of the advantages of an addressable node on a network. The addressable node may amplify signals received from uphole 66*b* or downhole 66*a* sources, be used as a point of data acquisition, and be used to provide control signals to desired devices 84. These represent only a few examples of the versatility of the link module 30. Thus, the link module circuit 58, although useful and functional as a repeater 30, may have a greatly expanded capability.

Figure 6:
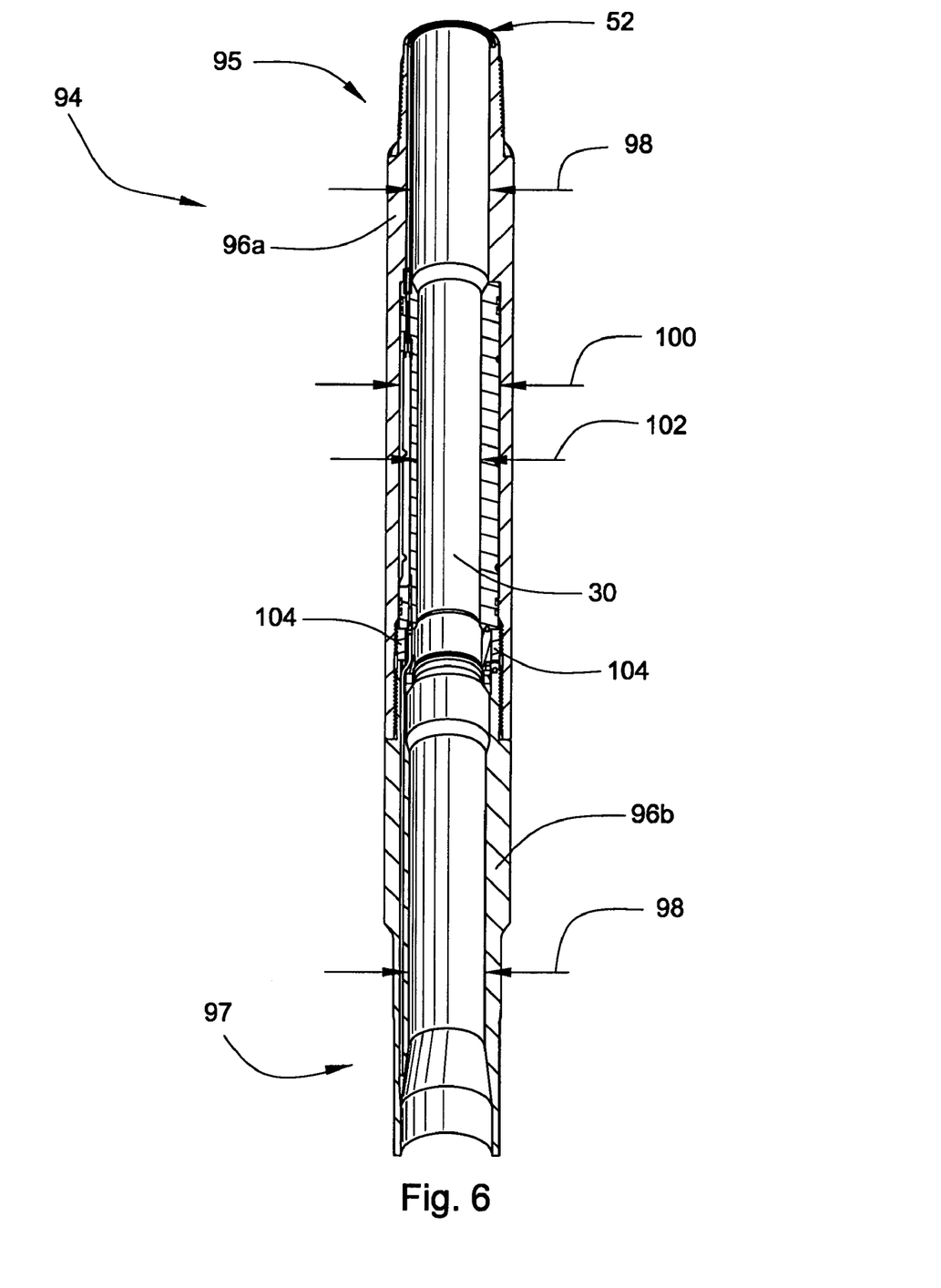
FIG. 6 is a perspective cross-sectional view illustrating one embodiment of a host downhole tool that may be used to house or enclose a link module in accordance with the present invention.

Referring to FIG. 6, a host downhole tool 94 may be used to house the link module 30. For example, a host downhole tool 94 may include a first portion 96*b* threadable into a second portion 96*a*. The first portion 96*a* may include a pin end 95 connectable to another downhole tool 16. Likewise, a second portion 96*b* may include a box end (not shown) connectable to the pin end of another downhole tool 16.

The first and second portions 96*a*, 96*b* may have a standard bore size 98 typical of various downhole tools 16. An oversize bore 100 may be provided to accommodate the link module 30, which may have a narrowed bore 102 smaller than the standard bore 98, but sufficient to accommodate the flow of mud or other drilling fluids flowing therethrough. Nevertheless, as was previously stated, as electronic circuitry, batteries, and the like become smaller and more compact, the diameter of the narrow bore 102 will more closely approximate the diameter of the standard bore 98.

Drill pipe 16 suitable for use with the present invention typically includes a pin end that threads into a corresponding box end of another downhole tool. Normally, a primary shoulder on a pin end mates to a corresponding primary shoulder on the box end. Likewise, a secondary shoulder on the pin end mates to a corresponding secondary shoulder on the box end.

Although a primary shoulder may absorb the majority of the joint stress between two interconnected downhole tools, stress absorbed by the secondary shoulder is significant to the strength of the joint. Thus, when threading a first portion 96*b* of a host downhole tool 94 into a second portion 96*a*, the structure 96*a*, 96*b* should provide at least as much strength as is provided by a normal pin end and box end connection.

As is illustrated, the portion 96*a* lacks a secondary shoulder to enable insertion of link module 30 into the oversize bore 100. Thus, in selected embodiments a secondary shoulder insert 104 may be inserted into the portion 96*a* to absorb stress normally incident on a secondary shoulder. In addition, since the insert 104 absorbs stress normally incident on a secondary shoulder, pressure may be relieved from the link module 30. More details with respect to the secondary shoulder insert 104 are provided in the description of FIG. 8.

In addition, a transmission interface 106 may be provided that couples to the link module 30 to permit routing of a transmission path from the link module 30 into the portion 96*b* of the host downhole tool 94. More details with respect to the transmission interface 106 are provided in the description of FIG. 8.

Figure 7:
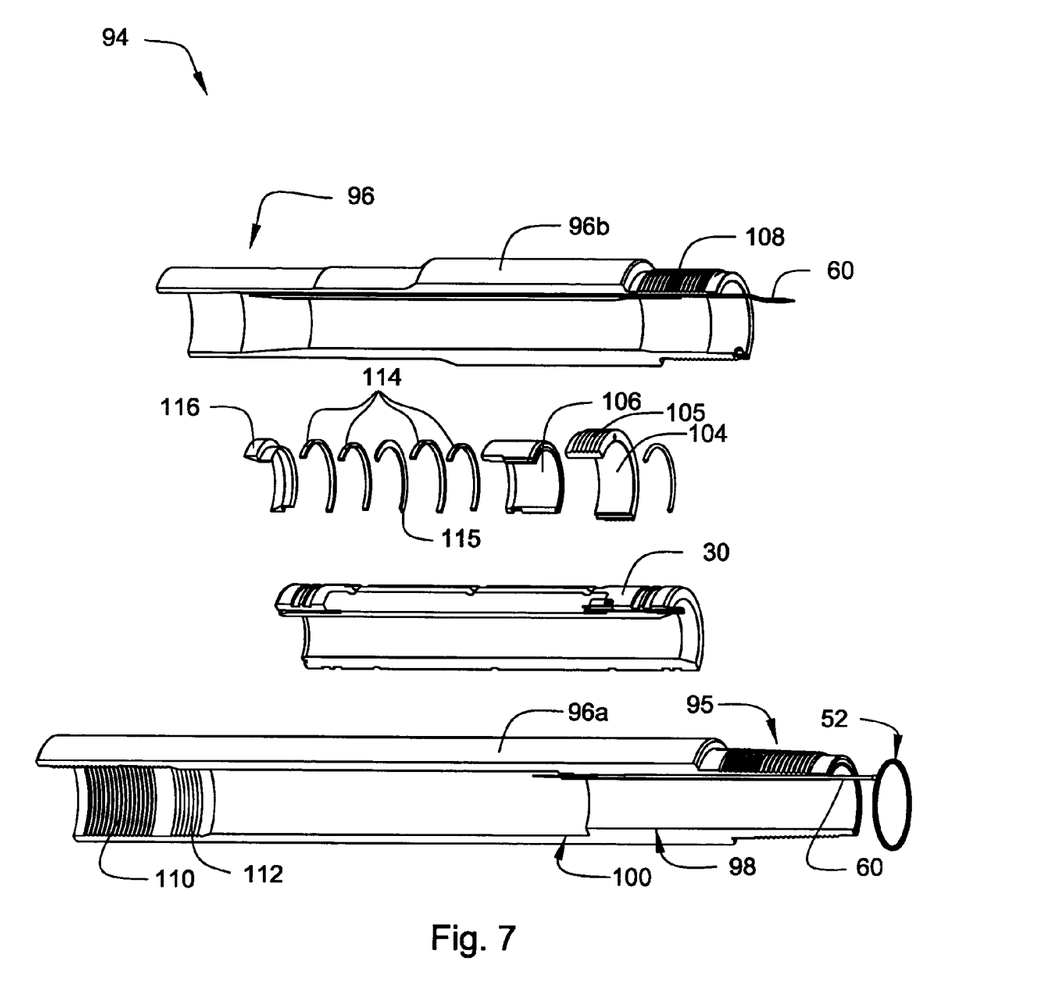
FIG. 7 is an exploded, perspective, cross-sectional view illustrating certain selected embodiments of components used in conjunction with a link module and a host downhole tool in accordance with the present invention.

Referring to FIG. 7, an exploded perspective view of the host downhole tool 94, containing the link module 30, is illustrated. As illustrated, a first portion 96*a* may include a threaded pin end 95. An annular transmission element 52, which may operate by inductive coupling or direct electrical contact, may reside within an annular recess formed or milled into the pin end 95. A conductor 60 or other cable 60 may be connected to the transmission element 52 and be transmitted along the section 96*a*.

As was previously mentioned, an oversized bore 100, larger than the standard bore 98, may be provided to accommodate the link module 30. Likewise, within the inside diameter of the pipe section 96*a*, insert grooves 112 or other surface characteristics 112 may be provided to engage corresponding grooves or surface characteristics of the secondary shoulder insert 104. The pipe section 96*a* may also include internal threads 110 that may couple to external threads 108 of the other section 96*b*.

Also illustrated are the secondary shoulder insert 104, insert grooves 105 or surface characteristics 105 that may engage corresponding grooves 112 in the pipe section 96*a*, a transmission interface 106 that may slide into the secondary shoulder insert 104 to couple to the link module 30. Also illustrated are several springs that may be used to keep the transmission interface 106 pressed firmly against the link module 30 to ensure that signal coupling successfully occurs between each component 30, 106.

The springs 114 may include a separator 115 used to isolate the springs 114 and improve the range of bias. Lastly, an annular buttress 116 may sit within the pipe section 96*b* and provide a fixed surface for the springs 114 to press against. Added details with respect to the annular buttress 116, springs 114, spacer 115, transmission interface 106, and the secondary shoulder insert 104 are provided in an enlarged cross-sectional view in FIG. 8.

Figure 8:
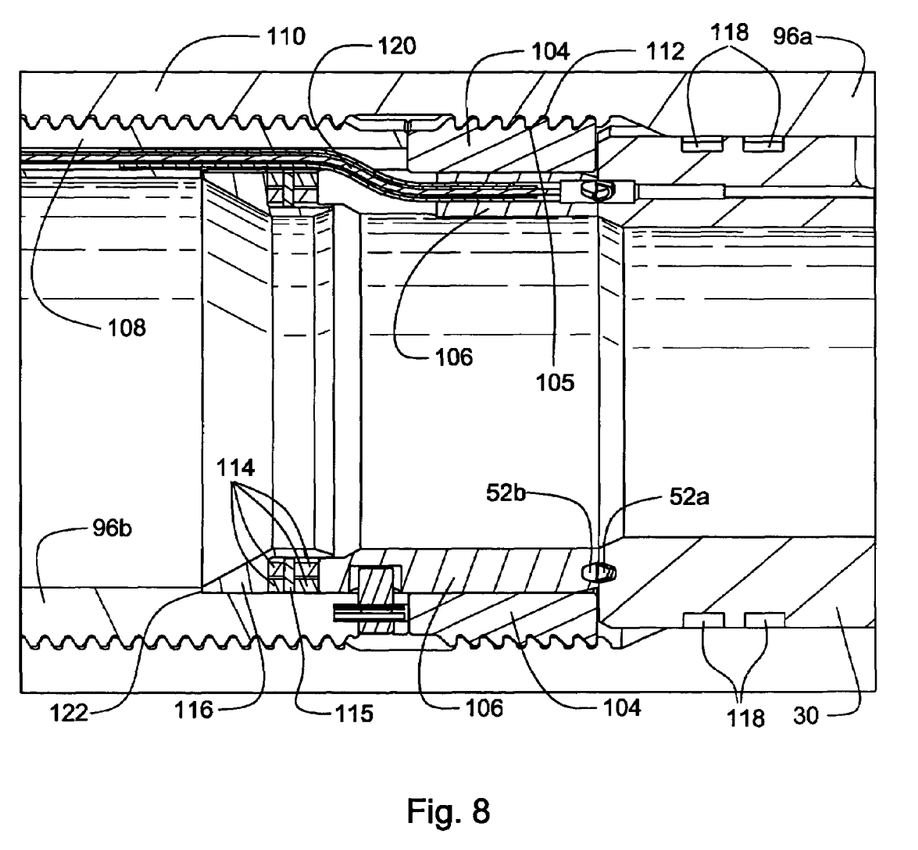
FIG. 8 is an enlarged cross-sectional view illustrating more detail of various component components illustrated in FIGS. 6 and 7.

Referring to FIG. 8, an enlarged cross-sectional view of the joint between pipe sections 96*a*, 96*b* shown in FIG. 6 is illustrated. For example, external threads of the pipe section 96*b* may thread into internal threads 110 of the other pipe section 96*a*. As was previously explained, due to the lack of a natural secondary shoulder, a secondary shoulder insert 104 may include grooves 105 or threads 105 that may engage corresponding grooves 112 formed in the internal diameter of the section 96a. Thus, the secondary shoulder insert 104 may provide a quasi-secondary shoulder, but also be removed to allow insertion and removal of the link module 30 from the pipe section 96a.

As was also previously described, a transmission interface 106 may fit within the inside diameter of the secondary shoulder insert 104 and be pressed firmly against the link module 30 to provide effective signal coupling therefrom. For example, the link module 30 may include an annular transmission element 52. The transmission interface 106 may also include an annular transmission element 52b in close proximity to the transmission element 52a to provide efficient signal coupling therebetween.

The transmission interface 106 may include a link transition area 120 where the cable may transition from the transmission interface 106 into a bore within the pipe section 96b. In order to keep the transmission interface 106 pressed firmly against the link module 30, several annular springs 114 may be provided to provide a biasing force.

In selected embodiments, the annular springs 114 may be separated by a separator ring 115 to provide addition range of motion to the bias. Likewise, an annular buttress 116 may sit against a shoulder 122 formed in the pipe section 96b to provide a firm push-point for the springs 114. As was previously mentioned in the description of FIG. 2, various seals 118 in grooves or recesses of the link module 30 may seal against the inside diameter of the pipe section 96a thereby keeping out unwanted contaminants.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description.

What is claimed and desired to be secured by United States Letters Patent is:

1. A downhole repeater assembly comprising:
    a host drill string pipe comprising a threaded pin end comprising an integal primary and integral secondary shoulder and a threaded box end comprising a primary shoulder and an oversize bore adjacent the primary shoulder;
    a cylindrical insert housing, characterized by a proximal end and a distal end, having a substantially cylindrical wall having an outer rounded surface about equal to the oversize bore, the cylindrical wall defining a central bore passing therethrough;
    the cylindrical insert housing further formed to define at least one recess in the outer rounded surface of the cylindrical wall;
    a repeater circuit located within the at least one recess;
    the cylindrical insert housing further comprising a radial annular recess perpendicular to the central bore and formed into at least one of the proximal end and the distal end; and
    an axial annular transmission element located in the annular recess, the axial annular transmission element operably connected to the repeater,
    wherein the cylindrical housing is inserted into the oversize bore and fixed in place using a secondary shoulder insert comprising engagement grooves.

2. The downhole repeater assembly of claim 1, further comprising a first channel, formed within the cylindrical housing, extending from the at least one recess to at least one of the proximal and distal end.

3. The downhole repeater assembly of claim 1, wherein the annular transmission element inductively converts electrical energy to magnetic energy.

4. The downhole repeater assembly of claim 1, wherein the annular transmission element comprises an electrical contact to transmit electrical energy directly to another contact.

5. The downhole repeater assembly of claim 1, further comprising at least one battery located in the at least one recess.

6. The downhole repeater assembly of claim 1, wherein: the cylindrical housing is inserted into the bore of a host downhole tool; and the host downhole tool further comprises a pin end and a box end, the pin end having an external threaded portion and the box end having an internal threaded portion.

7. The downhole repeater assembly of claim 6, wherein the box end lacks an integrated secondary shoulder.

8. The downhole repeater assembly of claim 7, further comprising a secondary shoulder insert inserted into the box end, independent from the box end, capable of absorbing stresses normally incident on an integrated secondary shoulder.

9. The downhole repeater assembly of claim 8, wherein stresses normally incident on a secondary shoulder are not imposed on the cylindrical housing.

10. The downhole repeater assembly of claim 8, wherein surface characteristics of the secondary shoulder insert engage corresponding surface characteristics of the inside diameter of the host tool to transfer a load, incident on the secondary shoulder insert, to the host tool.

11. The downhole repeater assembly of claim 1, wherein the repeater circuit further comprises a data acquisition circuit to acquire data from at least one sensor.

12. The downhole repeater assembly of claim 11, wherein the at least one sensor is selected from the group consist of a pressure transducer, an inclinometer, a thermocoupler, an accelerometer, an imaging device, and a seismic device.

13. The downhole repeater assembly of claim 1, wherein the repeater circuit further includes components selected from the group consisting of signal filtering circuitry, signal error checking circuitry, device control circuitry, a modem, a digital signal processor, and a microcontroller.

14. A downhole module comprising: a cylindrical insert housing, characterized by a proximal end and a distal end, having a substantially cylindrical wall, the cylindrical wall defining a central bore passing therethrough; the cylindrical insert housing further formed to define at least one axial recess in the cylindrical wall; a repeater circuit located within the at least one axial recess; and a data acquisition circuit located within the at least axial one recess, connected to the repeater circuit, to acquire data from at least one sensor, the cylindrical insert housing further comprising a radial annular recess perpendicular to the central bore and formed into at least one of the proximal end and the distal end and an axial annular transmission element located in the annular recess, the axial annular transmission element operably connected to the repeater, wherein the cylindrical housing is inserted into the oversize bore and fixed in place using a secondary shoulder insert comprising engagement grooves.

15. The downhole module of claim 14, further comprising an uphole data link extending from the repeater circuit to the proximal end, and a downhole data link extending from the repeater circuit to the distal end.

16. The downhole module of claim 14, wherein the cylindrical housing is characterized by at least one annular recess formed into at least one of the proximal end and the distal end.

17. The downhole module of claim 16, wherein the cylindrical housing further comprises an annular transmission element located in the annular recess.

18. The downhole module of claim 14, further comprising at least one battery located in the at least one recess.

19. The downhole module of claim 14, wherein the at least one sensor is selected from the group consisting of a pressure transducer, an inclinometer, a thermocoupler, an accelerometer, an imaging device, and a seismic device.

20. A downhole repeater assembly comprising: a cylindrical insert housing, characterized by a proximal end and a distal end, having a substantially cylindrical wall, the cylindrical wall defining a central bore passing therethrough; the cylindrical housing having at least one axial recess formed into the outer rounded surface of the cylindrical wall; and a signal repeater located within the at least one axial recess the cylindrical insert housing further comprising a radial annular recess perpendicular to the central bore and formed into at least one of the proximal end and the distal end; and an axial annular transmission element located in the annular recess, the axial annular transmission element operably connected to the repeater, wherein the cylindrical housing is inserted into the oversize bore and fixed in place using a secondary shoulder insert comprising engagement grooves.

\* \* \* \* \*